United States Patent Office 3,531,231
Patented Sept. 29, 1970

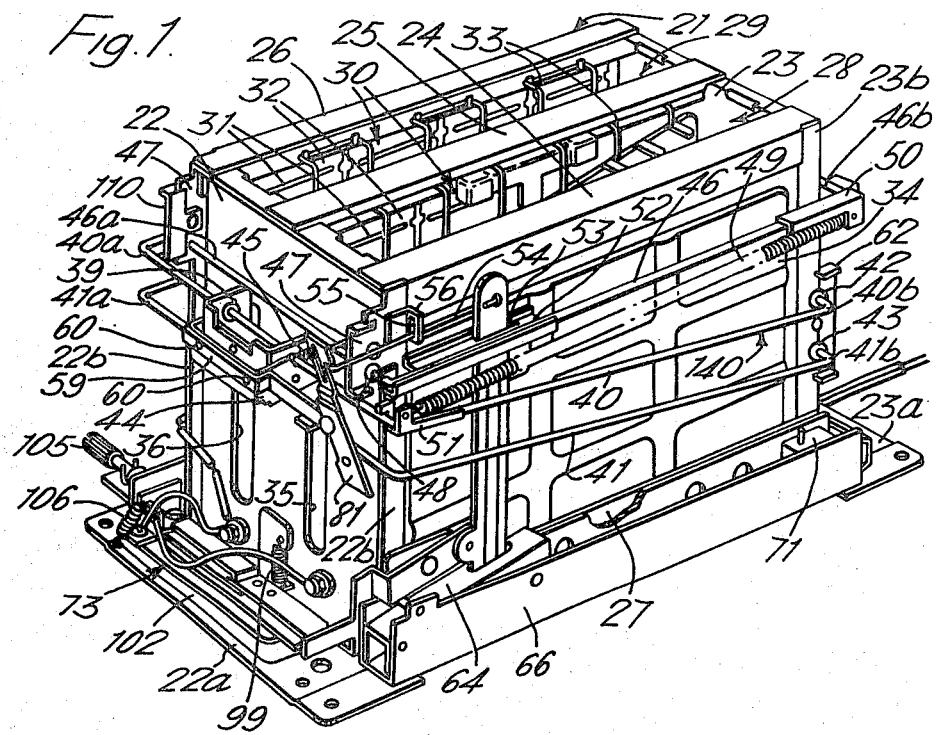
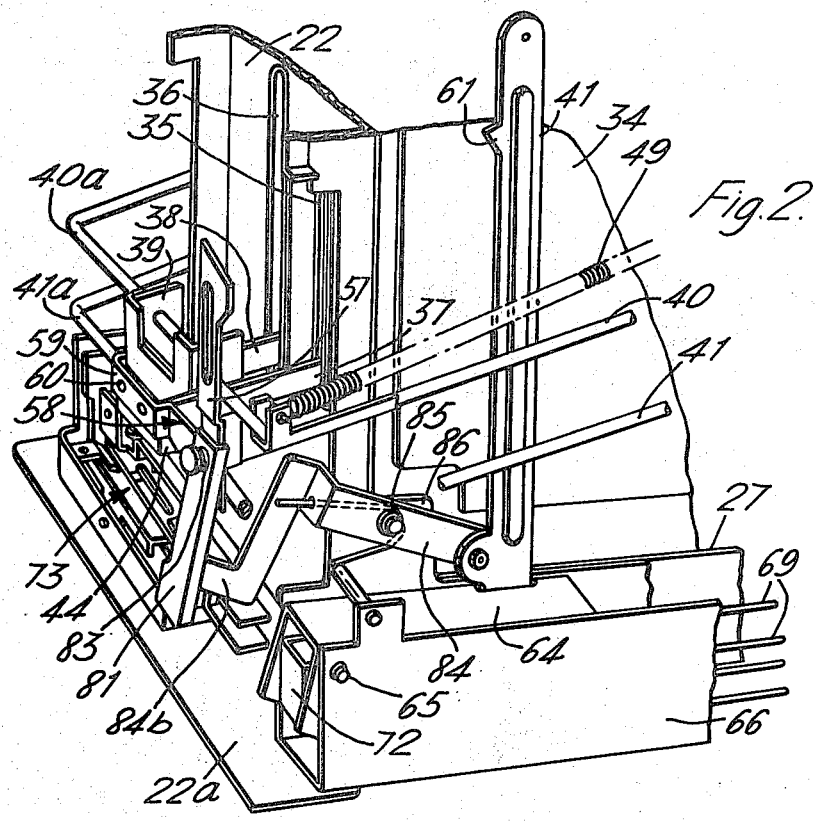

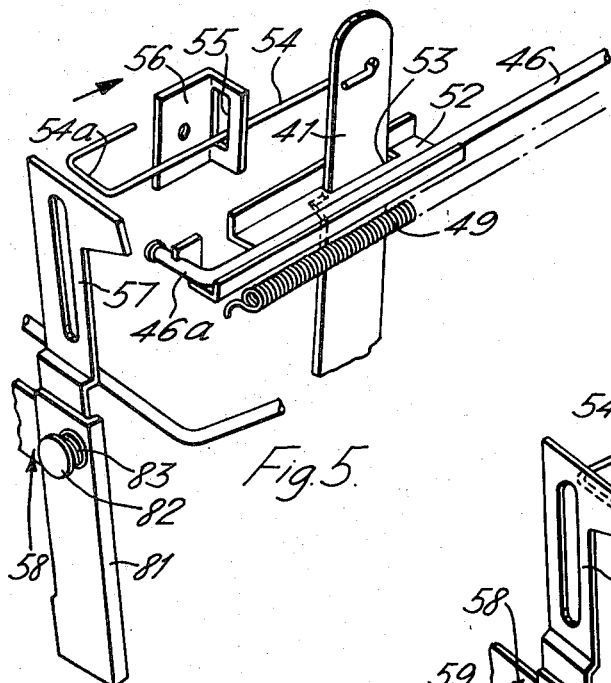
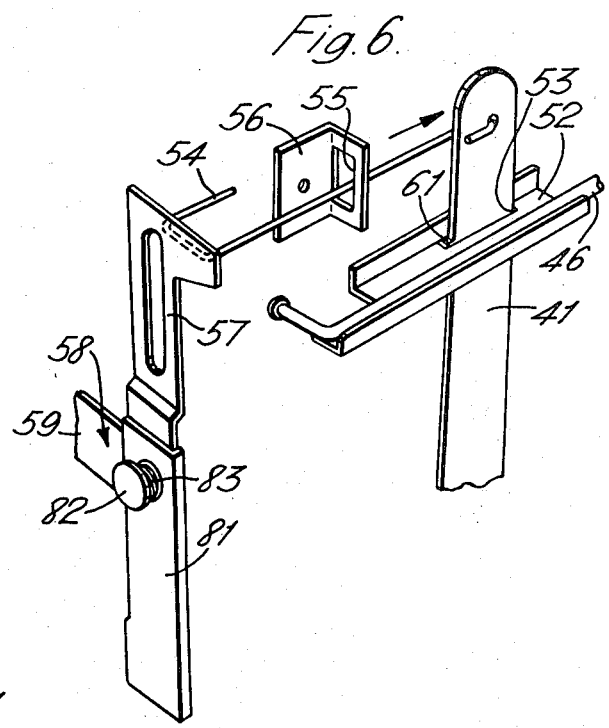
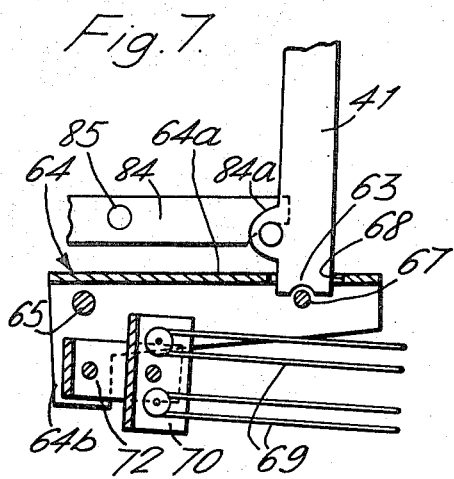
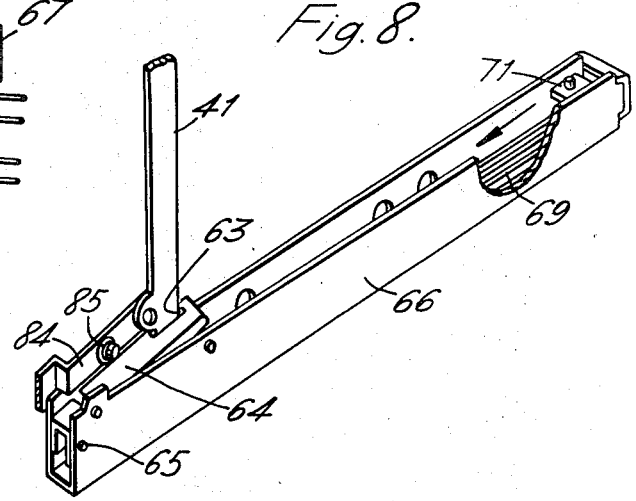

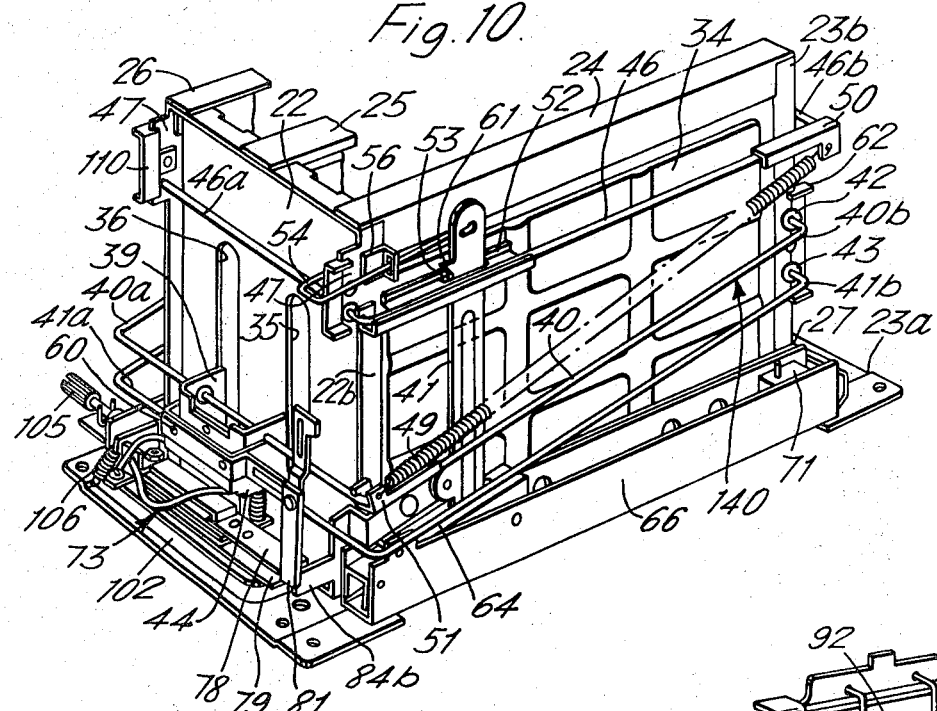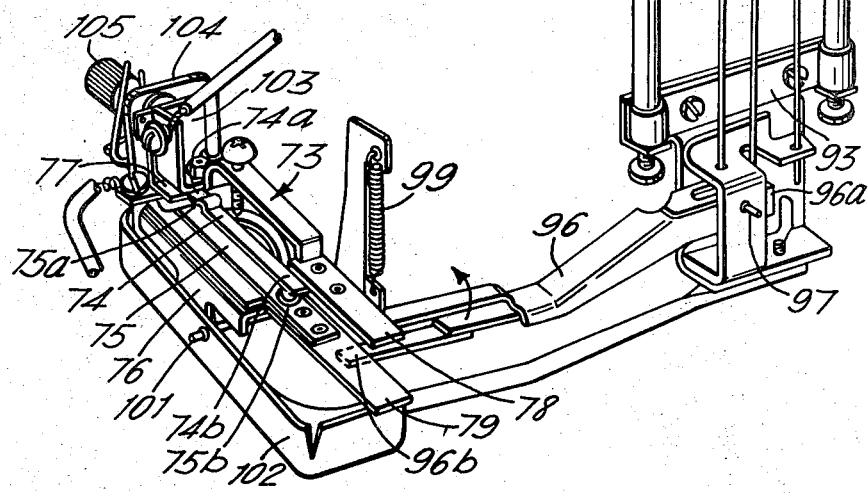

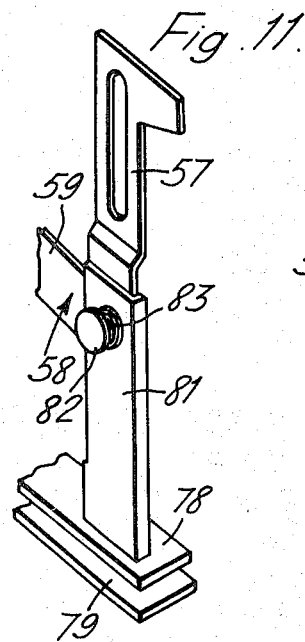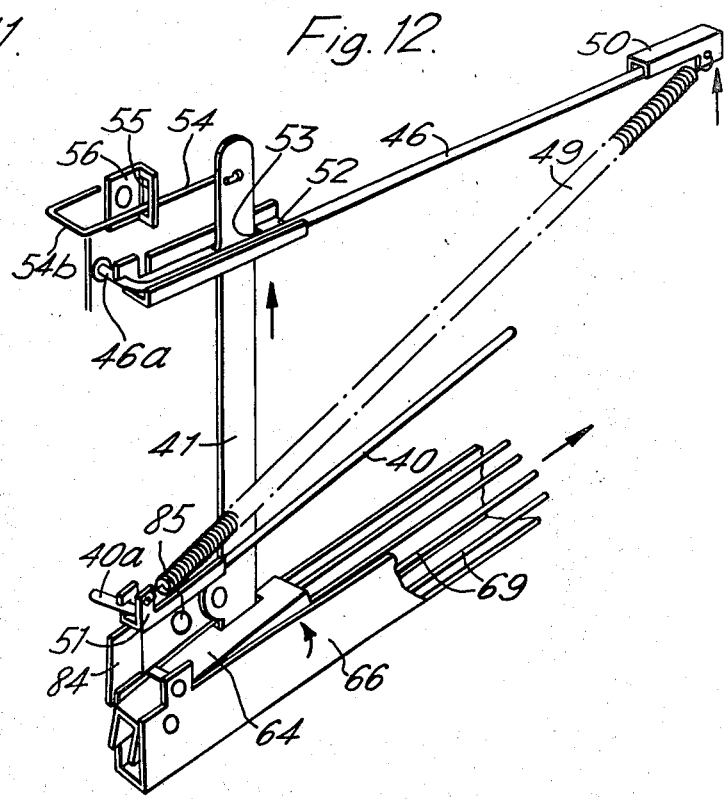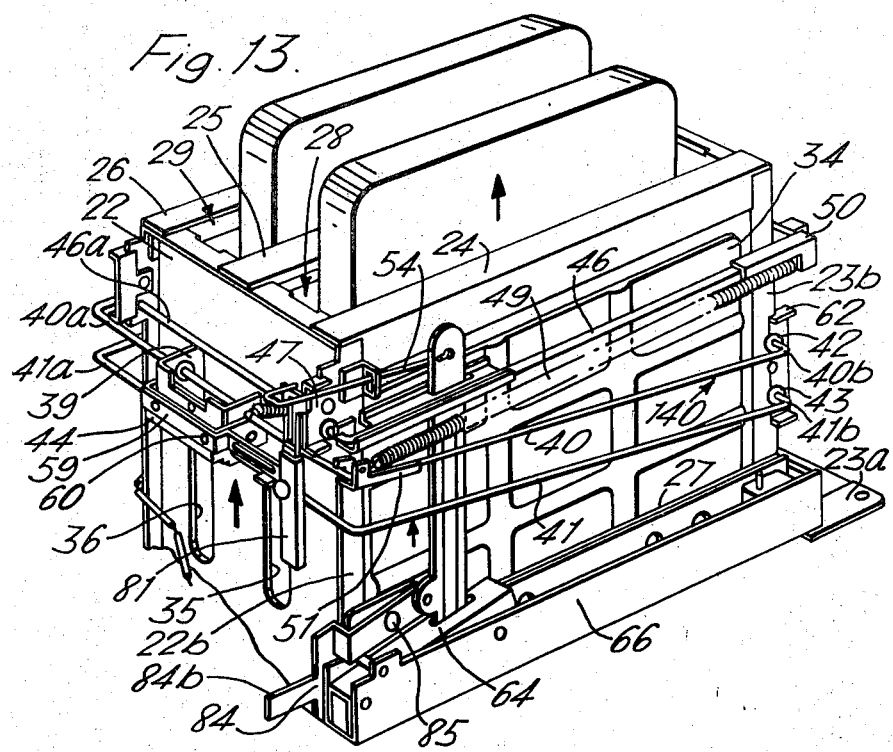

3,531,231
TOASTER
Nobuyuki Kawamura, Nara, Japan, assignor to Sanyo Electric Co., Ltd., and Yamano Electric Manufacturing Co., Ltd., both of Osaka, Japan, and both corporations of Japan
Filed Feb. 6, 1969, Ser. No. 797,158
Claims priority, application Japan, Feb. 9, 1968, 43/8,065, 43/8,066, 43/9,086
Int. Cl. A47j *37/08*
U.S. Cl. 99—329            7 Claims

ABSTRACT OF THE DISCLOSURE

An electric toaster in which a bread receiving bar in a toasting chamber is moved from its upper, non-toasting position to its lower, toasting position upon depositing a slice of bread on the bread receiving bar and upon completion of the toasting of the bread, respectively, through the utilization of a particular movable spring end holder to which one end of a tensile spring for suspension of the lever structure supporting the bread receiving bar is connected, the tension of the spring being varied with the movement of the spring end holder between said two positions.

BACKGROUND OF THE INVENTION

This invention relates to electric toasting apparatus and more particularly to means for moving the bread receiving bar or bars between the upper, non-toasting position and the lower, toasting position.

The primary object of the invention is to provide a new and improved electric toaster in which the movement of the bread receiving bar in the toasting chamber between its non-toasting and toasting positions is carried out in an instantaneously quick motion and smoothly more than in the conventional type of electric toasters.

Another object of the invention is to provide an electric toaster in which the movement of the bread receiving bar from the non-toasting position to the toasting position is carried out automatically upon depositing a slice of bread on the bread receiving bar.

A further object of the invention is to provide an electric toaster in which the movement of the bread receiving bar from the toasting position to the non-toasting position is carried out automatically when the toasting of bread has been finished.

A still further object of the invention is to provide a new and improved means for detecting the degree of toasting of the bread, which means is heat responsive and enables to stop the toasting operation in response to the temperature in the toasting chamber when the toasting of bread has been finished.

SUMMARY OF INVENTION

The toaster according to the invention includes a heating unit, at least one bread receiving bar movable between an upper, non-toasting position and a lower toasting position within a toasting chamber and means for driving the bread receiving bar between said two positions. Means for driving the bread receiving bar comprises a spring end holder movable between a preselected uppermost position and a preselected lowermost position, means for arresting said spring end holder at its uppermost position, a release member for releasing said spring end holder from arrestment at its uppermost position to free it for movement toward its lowermost position, a swing lever structure pivotally carried at its one end, said lever structure supporting at its free end the bread receiving bar, and a tensile spring stretched between the spring and holder and the swing lever structure.

The uppermost and lowermost positions of the spring end holder and/or the tension of the tensile spring mentioned in the above are so preselected that if the spring end holder is at its uppermost position the spring tension is large enough to hold the swing lever structure at its uppermost position while if the spring end holder is at its lowermost position the spring tension is overcome by the total weight load applied on said swing lever structure when a slice of bread is loaded on said bread receiving bar.

The spring end holder may comprise another swing lever structure pivotally carried at its one end and having a free end to which one end of the tensile spring is connected. The spring end holder in the form of a swing lever may be connected at its free end by the tensile spring with the free end of the swing lever structure for supporting the bread receiving bar so as to form a Z-shape.

Preferably, the toaster further includes means for actuating the release member in response to the loading of a slice of bread on the bread receiving bar. The toaster may also include heat responsive means for detecting completion of the toasting of bread and means for lifting the spring and holder from its lowermost position to its uppermost position in response to movement of the heat responsive means when the toasting of bread has been finished.

In another preferred embodiment, the toaster is provided with an electrical switch which can be closed by the movement of the swing structure for supporting the bread receiving bar when the bread receiving bar reaches its toasting position. The electrical switch is for controlling the supply of an electric current to the heating unit. The switch can be opened by the operation of a heat responsive means which is expansible in response to the temperature in the toasting chamber.

Other features and advantage of the invention will become apparent from the description of the preferred embodiment of the invention with reference to the drawings.

BRIEF DESCRIPTION OF THE DRAWINGS

FIG. 1 is a perspective view of an electric toaster embodying the present invention with the outer shell being removed and not shown;

FIG. 2 is a perspective view, on an enlarged scale, of the front bottom portion of the toaster illustrated in FIG. 1;

FIG. 5 is a perspective view, on an enlarged scale, showing means for arresting the spring end holder at its uppermost position and its release member which are included in the toaster of the invention illustrated in FIG. 1;

FIG. 6 is a similar view to FIG. 5 showing the state in which the spring end holder is being released from arrestment at its uppermost position;

FIG. 7 is a sectional view, on an enlarged scale, showing the connection of the lifting member for lifting the spring end holder with thermally expansive means;

FIG. 8 is a perspective view of a channel member which includes thermally expansive means;

FIG. 9 is a perspective view, on an enlarged scale, showing the switch assembly and the heat responsive switch actuating means included in the toaster illustrated in FIG. 1;

FIG. 10 is a perspective view of the toaster illustrated in FIG. 1, partly cut off and showing the state when the lever structure is reaching the lowermost position;

FIG. 11 is a perspective view, on an enlarged scale, of the push rod engaging the switch assembly to place the latter in a closed position;

FIG. 12 is a perspective view, on an enlarged scale, of the spring end holder and means for lifting it at the state of lifting;

FIG. 13 is a perspective view of the top portion of the toaster illustrated in FIG. 11, showing the state where the slices of bread are in the positions for taking out after toasting has been finished;

DESCRIPTION OF THE PREFERRED EMBODIMENT

Figure 3:
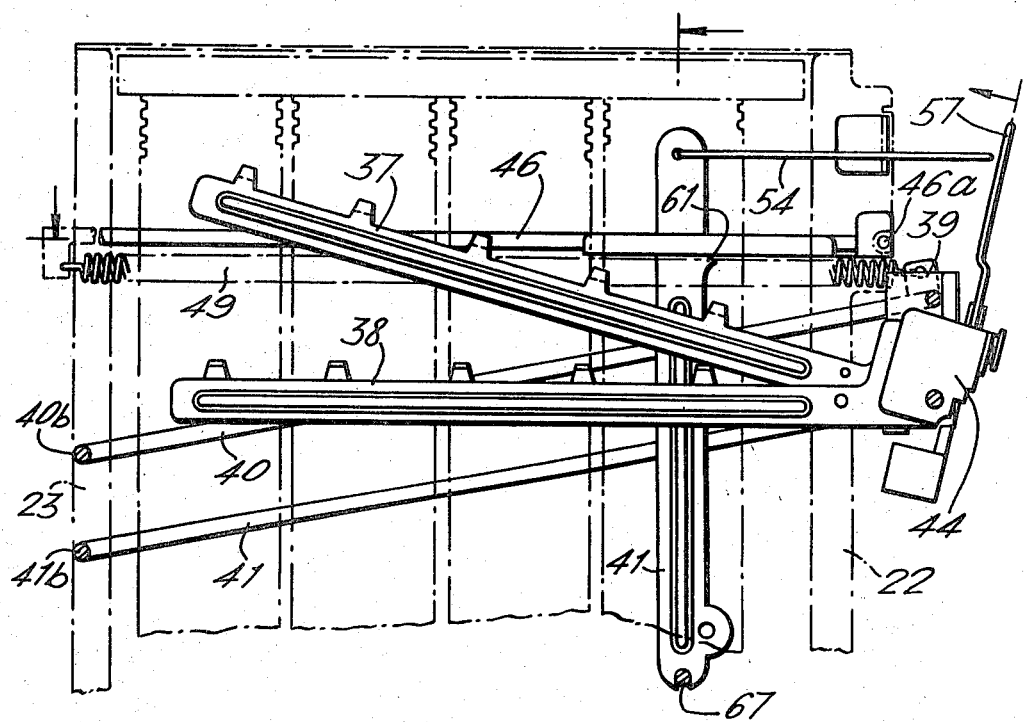
FIG. 3 is a back side view, on an enlarged scale, of the bread receiving bars of the toaster illustrated in FIG. 1, in which the bread receiving bars are in the non-toasting position.

Referring to the drawings, and first particularly to FIG. 1, there is shown a toaster including a metal support structure generally indicated as 21 which may be covered by an outer shell (not shown) according to a conventional manner. The metal support structure 21 includes a pair of end plates 22 and 23 and a plurality of upper supporting ribs 24, 25 and 26 and lower ribs, one of which is shown at 27, extending between the end plates 22 and 23. The end plates 22 and 23 may be L-shaped in a vertical section and U-shaped in a horizontal section to form bottom wall portions 22a and 23a, and side extensions 22b and 23b, respectively.

The toaster may be provided with a number of toasting chambers or wells desired with the conventional arrangement being two chambers 28 and 29 positioned in side by side relation. The spaces between the upper ribs 24 and 25, and between the ribs 25 and 26 form bread receiving slots to cooperate with the toasting chambers 28 and 29, respectively.

Each of the toasting chambers 28 and 29 is provided with a heater 30 having a heating wire 31 wound on a mica plate 32, a guard 33 for protecting any slices of bread inserted in the chamber from being in contact with the heater 30. The opposite lateral sides are covered by a pair of reflecting plates, one of which is shown at 34.

Th front end plate 22 is formed with a pair of vertically extending slots 35 and 36 through which bread receiving bars 37 and 38 extend into the toasting chambers 28 and 29, respectively as more clearly shown in FIG. 2. The shape of each of the bread receiving bars 37 and 38 is best illustrated in FIG. 3. One end of the bread receiving bar 38 is fixed in the front of the end plate 22 to a connecting member 39 which connects to a pair of spaced bar frames 40 and 41 to each other at their front sides 40a and 41a. The bar frames are square shaped to surround the whole support structure 20. These two bar frames 40 and 41 are parallel to each other and pivotally carried at their respective rear sides 40b and 41b by the side extensions 23b of the rear end plate 23 at 42 and 43. In this manner the bread bar 38 is always maintained horizontally during the pivotal movement of the frames 40 and 41.

The bread receiving bar 37 is fixed at its one end to a support member 44 which is pivotally carried by the front side 41b of the lower bar frame 41. A coil spring 45 is stretched between the front side 40a of the upper bar 40 and the support member 44 so that the bread receiving bar 37 is usually maintained at an inclined position having a definite angle with the free end of the toasting chamber 28 being upwardly directed so far as no external force is applied to the bar 37.

The two parallel frames 40 and 41 constitute a lever structure for supporting the bread receiving bars 37 and 38. This lever structure including the frames 40 and 41 will be hereinbelow generally indicated with the reference numeral 40.

Another square bar frame 46 surrounding the support structure 21 above the bar frame 40 is pivotally carried at its front side 46a by brackets 47 extended from side extensions 22b of the front end plate 22. The reference numeral 48 indicates the pivotal point of the bracket 47 for carrying the front side 46a of the frame 46. The rear side 46b is accordingly the free end.

The bar frame may be called a spring end holder since the free end of the bar frame 46 is connected by a coil spring 49 to the free end of the bar frame 40. The coil spring 49 is stretched between the bracket 50 secured to the rear side 46b of the frame 46 and the bracket 51 secured to the front side 40a of the frame 40 so as to have an extended length from its free length. The coil spring 49 never assumes its free length state within the range of movement of the free ends of the frames 46 and 40 so that the spring 49 is always pulling the two frames 46 and 40 toward each other always in the direction of the length of the coil spring.

It will be understood that the spring end holder comprising a lever structure 46, the tensile spring 49 and the lever structure 140 including the two frames 40 and 41 are connected together in a Z-shape.

As clearly shown in FIGS. 1, 4, 5, 6, 10, 12 and 13 an elongated bracket 52 is mounted on the lateral side of the frame 46 toward its front end. The bracket 52 is formed with a slot 53 through which a lifting rod 41 extends substantially vertically. The top end of the lifting rod 41 is connected to one end of a wire 54 extending substantially horizontally and forwardly through a slot 55 formed in a bracket 56 which is fixed to a side extension 22b of the front end plate 22. The other end 54a of the wire 54 which is U-turned is engageable with a release member 57 which is formed as an extension of the before-mentioned member 44. In the embodiment illustrated in the drawings, the reelase member 57 is formed as the vertically extending portion of an L-shaped member 58, the horizontally extending portion 59 of which is secured at 60 to the support member 44. Usually, the top end of the release member 57 is kept apart from the front end 54a of the wire 55 by the force of the before-mentioned spring, but the former is engageable with the latter when the support 44 having the bread supporting bar 37 pivotally moves in a clockwise direction in FIG. 1, and in a counterclockwise direction in FIG. 3. The state of the engagement of the release member 57 with the wire end 54a is illustrated in FIG. 6.

The lifting bar 41 has a latch 61 as shown in FIGS. 2, 4, 6 and 10 which is engageable with the bottom surface of the elongated bracket 52 at the front end of the slot 53. By the engagement of the bracket 52 with the latch 61, the bar frame 46 is held at its uppermost position. If this engagement is released, the bar frame 46 becomes free to swing down about its pivotal axis 46a until its free end 46b reaches a stop 62 (FIGS. 1, 4 and 13) which is formed as a projection from the lateral extension 23b of the rear end plate 23.

The lower end 63 of the lifting bar 41 is connected or engaged with one end of an L-shaped lever 64 pivotally carried at 65 by an open channel member 66 as best shown in FIGS. 7 and 8. In the embodiment illustrated in the drawings, the L-shaped member 64 comprises a horizontally extending portion 64a and a vertically extending portion 64. The horizontally extending portion 64a is of a downwardly open channel section and has a pin 67 between the lateral sides thereof. The lower end of the lifting bar 41 extends through a slot 68 formed in the top portion (the bottom side of the channel section) of the horizontally extending portion 64a and is supported on the pin 67 so that a connection is achieved between the lifting bar 41 and the L-shaped lever 64. However, any other means may be utilized for the connection of these members.

The channel member 66 extends along the lower rib 27 between the bottom walls 22a and 23a of the end plates 22 and 23. Within the channel member 66 a thermally expansive heating wire 69 is stretched between a pair of end supports 70 and 71. The support 71 is fixed to the rear end of the channel member 66 while the support 70 is connected by a connecting rod 72 to the vertically extending portion 64b of the L-shaped member 64 so as to be movable together with the member 64 according to expansion and contraction of the wire 69. The pivotal movement of the member 64 is then transmitted to the lifting bar 41 for its going up and down.

On the bottom wall portion 22a of the front end plate 22 a switch assembly generally indicated as 73 is mounted for controlling electric current supply to the heating units 30 in the toasting chambers and the thermally expansive wire 69. The switch assembly 73 includes a pair of contact members 74 and 75 which may be in the form of an elongated metal plate, one end of each being secured at 74a and 75a on a support plate 76 with an insulating material 77 therebetween to keep them in a spaced relationship. The contact members 74 and 75 can become into contact with each other at their free ends 74b and 75b each having an extension 78, 79 made of an insulating material. The lower contact member 75 is deposited on the support plate 76 but it can be bent with its free end 75b going upward when an external force is applied to the extension 79. The upper contact member 74 can take two alternative positions, the uppermost and lowermost positions. In the uppermost position the contact member 74 engages at its extension 78 with a limit stop 80 while in the lowermost position it becomes into contact with the lower contact member 75 at their respective free ends 74b and 75b. The upper contact member 74 cannot, however, assume any neutral position between the above-mentioned two positions since it is always alternatively biased by virtue of its own material and shape resilience.

The extension 78 of the upper contact member 74 is engageable with the bottom end of a push rod 81 the top end of which is connected to the corner portion of the before-mentioned L-shaped member 58 at a connecting pin 82. The push rod 81 is not fixed to the member 58 but usually maintained by the force of a spring 83 inserted between the head of the connecting pin 82 and the member 81. When the support 44 with the push rod 81 goes down according as the lever structure 140 swings down the bottom end of the push rod 81 becomes into contact with the extension 78 of the upper contact member 74 to push down it whereby the upper contact member 74 is reversed to the contact position.

In FIG. 2 there is illustrated release means for disengaging the push rod 81 from the extension 78 of the upper contact member 74b. This release means comprises a lever 84 pivotally carried at a pivot 85 which is then supported by a bracket 86 which may be an extension of the channel member 66. One end 84a of the lever 84 is always in contact with a lifting bar 41 at its projection 87 toward the bottom end of the bar 41. The lever 84 is biased by a spring 83 so that one end 84a of the lever may always be kept in contact with the projection 87. Usually the other end 84b is apart from the push rod 31 which is engaging the extension 78 of the contact member 74 but it can engage the push rod 81 to push forward it against the force of the spring 83 thereby the push rod 81 being disengaged from the extension 78 if the lever 34 is turned as shown in FIG. 2 in a clockwise direction. The force of the spring 88 biases the lifting bar 41 in a counterclockwise direction about the pin 67.

The contact of the contact members 74 and 75 with each other may be released by operation of heat responsive means. Referring to FIG. 9 of the drawings heat responsive means comprises a heat responsive thermally expansive wire 90 which is supported by a framework 91.

The framework 91 comprises an upper and lower frames 92 and 93 connected by a pair of parallel rods 94 and 95 which may be made of heat resisting and heat ray transparent glass such as miracron. The top end of the upper frame 92 while the bottom end of the wire 90 is connected to one end 96a of a lever 96 which is pivotally carried at a pivot 97 supported by an extension 98 of the lower frame 93. The other end 96a extends immediately beneath the extension 79 of the contact member 75. The reference numeral 99 indicates a spring for keeping the wire 90 in a tense condition. The framework 91 is positioned between the two toasting chambers 23 and 29 so that the wire 90 may be immediately responsive to the temperatures of any of the toasting chambers.

If the wire 90 is expanded in response to an increase in the temperature of a toasting chamber, the lever will turn in clockwise direction about the pivot 97 (FIG. 9) with the other end 96b becomes into contact with the extension 79 of the lower contact member 75 from its bottom surface to push it upward. The upper contact member 74 contacting the lower contact member 75 is moved upward together with the lower member 75 while it is reversed to the uppermost position where it is apart from the lower contact member and engages the limit stop 80.

The distance between the lever end 96b and the extension 79 of the lower contact member 75 is predetermined and may be controlled. The support plate 79 of the switch assembly 73 is pivotally carried at a pivot 101 supported by a base member 102 which is fixedly mounted on the bottom wall portion 22a of the front end plate 22. The support plate 76 has a vertically extending portion 103 facing an extension 104 of the base 102 vertically and upwardly extending from one end thereof. The distance between the two portions 103 and 104 may be controlled by a screw 105 which is carried by the member 104 and engages at its top end with the member 103. The contact pressure between the member 103 and the screw 105 is given by a spring 106 (FIG. 1) inserted between the base 102 and the member 76. The distance between 96b and 79 can thus be controlled by adjusting the screw 105.

Figure 14:
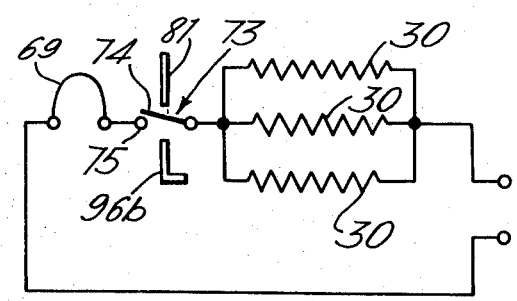
FIG. 14 is a circuit diagram of the electrical connection of the apparatus included in the toaster illustrated in FIG. 1.

FIG. 14 illustrates a circuit diagram of the electrical apparatus included in the toaster embodying the present invention. It will be seen from FIG. 14 that three heating units 30 are connected in parallel and to this parallel circuit are connected in series an electric switch assembly 73 and a thermally expansive heat sensitive wire 69. The switch assembly 73 included a pair of contact members 74 and 75 and push member 81 and 96b.

The operation of the toaster embodying the present invention is as follows:

In the ordinary state in which any slice of bread is not yet inserted into any of the toasting chambers 28 and 29 the spring end holder 46 is in its uppermost position in which the holder 46 is substantially horizontially supported by the engagement of the latch 61 of the lifting bar 41 with the elongated bracket 52 fixed to the holder 46. The lever structure 140 in the form of a parallelogram link work is also in its uppermost position with the free end 40a of the upper frame 40 thereof engaging the limit stops 110 which are projections from the lateral extensions 22b of the front end plate 22. This state is maintained by the force of the spring 49 stretched between the free end 46b of the spring end holder 46 and the free end of the frame 40. It will therefore be understood that the force of the spring 49 is so selected that in this condition the sum of the weights of the whole lever structure 140 and their accessory members including the bread receiving bars 37 and 38 is overcome by the force of the spring 49. The bread receiving bars 37 and 38 supported by the members 44 and 39 are thus in their respective uppermost, non-toasting positions as shown in FIG. 3. The bread receiving bar 37 is inclined with the free end thereof being upwardly directed with an angle by the force of the spring 45 while the bread receiving bar 38 is always maintained in a horizontally extending position.

Figure 4:
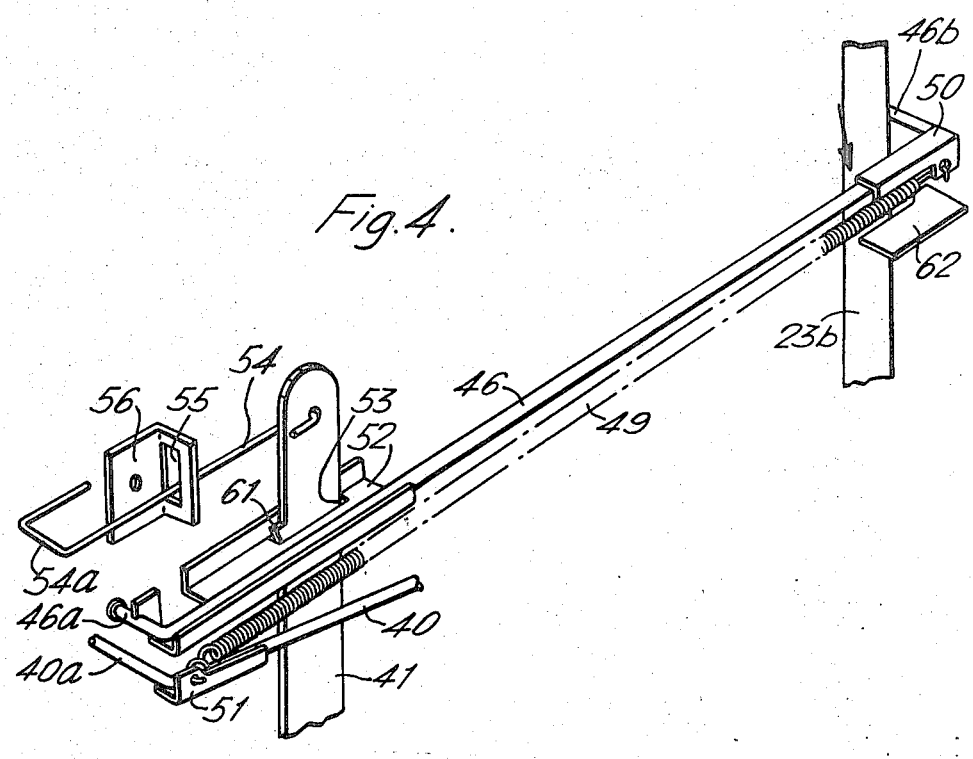
FIG. 4 is a perspective view, on an enlarged scale, of the spring end holder and the tensile spring particularly used for the toaster according to the invention illustrated in FIG. 1.

In such condition if a slice of bread is inserted into the toasting chamber 28 to be deposited on the bread receiving bar 37 with or without another slice of bread being inserted into another toasting chamber 29 to be deposited on the bread receiving bar 38, the weight of the slice of bread deposited on the bar 37 overcomes the force of the spring 45 to turn the support member 44 with the bread receiving bar 37 about its pivotal axis 41b until the bar 37 takes a horizontal position parallel to the other bar 38 with the support member 44 engaging a limit stop 111 (FIG. 3) formed in the member 39. During this operation the release member 57 which is an extension of the member 44 engages and pushes one end 54a of the wire 54, which movement is effective to push rearward the lifting bar 41 so that the latch 61 may be released from the engagement with the slot 53 of the bracket 52 at its one end, as shown in FIG. 6. The spring end holder 46 swings down about its pivotal axis 40a owing to its own weight in cooperation with the force of the spring 49 with the latch 61 passing upwardly through the slot 53 until the free end 46b of the holder 46 engages the stop 62 as the lowermost position of the holder 46, as shown in FIG. 4. Since the force of the spring 49 is reduced according as the free end 46b of the frame 46 goes down, the weight of the bread piece becomes to be able to overcome the force of the spring 49 for suspension of the lever structure 140 together with the bread receiving bars 31 and 38 with the result that the lever structure swings down about the pivot 40b and 41b until the bread receiving bars 37 and 38 reach the respective ends of the slots 35 and 36 formed in the front end plate 22 which are the toasting positions. In this manner the bread receiving bars 37 and 38 are moved downward from the non-toasting positions to the respective toasting positions.

Figure 15:
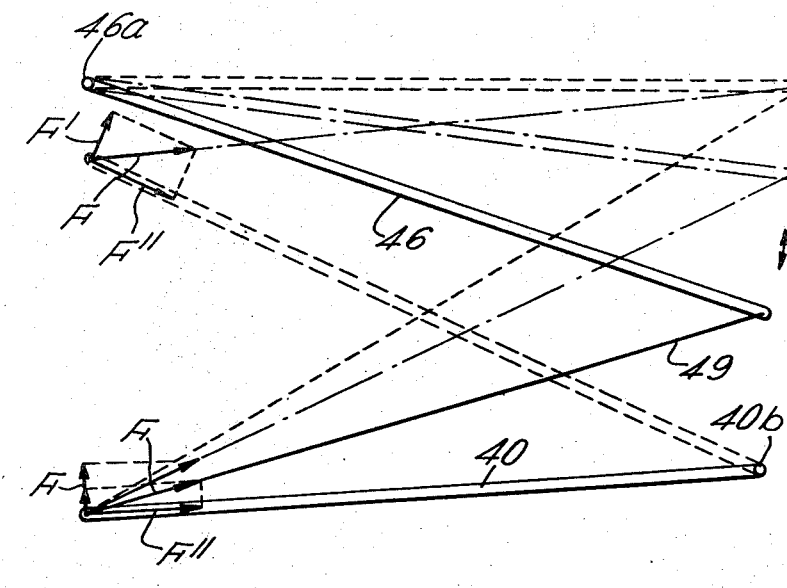
FIG. 15 is a vector diagram illustrating variation of the lifting force acting on the lever structure for supporting the bread receiving bars.

In practice the uppermost and lowermost positions of the spring end holder 46 and/or the tension of the spring 49 is so selected that at a certan point between the uppermost and lowermost positions of the spring end holder 46 there exists an equilibrium point in the state of which the force of the spring 49 balances the total weight of the sliced bread deposited on the bread receiving bar 37, the bread receiving bars 37 and 38 and the lever structure 140. As soon as the free end 46b of the frame 46b of the frame 46 passes such the balance point downwardly, the lever structure supporting bread slices on the bread receiving bars 37 and 38 can start to swing down as mentioned above. Vector analysis of the force of the spring 49 is illustrated in FIG. 15. Referring to FIG. 15, the spring force F can be resolved into two components, a force F" acting in the direction of the lateral side of the frame 40 and a force F' acting perpendicular thereto. The force for listing the frame 40, i.e. the lifting force, is the perpendicular force F'. The listing force F" is the largest when the spring end holder 46 is in the uppermost position and the smallest when in its lowermost position. At a certain point between the uppermost and the lowermost positions of the spring end holder 40 the lifting force F' will exactly balance with the total weight acting on the lever structure 140. If the holder 46 passes through this equilibrium point, the total weight acting on the lever structure 140 will become to overcome the lifting force F' with the result that the lever structure is moved from their uppermost position to the lowermost position. In actual working, since the movement of the frame 46 is effected in immediate response to the loading of slice of bread on the bread receiving bar 37 and with a very quick motion, the downward movement of the lever structure 140 is carried out in a very quick motion and immediately after insertion of a slice of bread into toasting chamber 28.

Toward the end of the downwardly swing movement of the lever structure 140 the push rod 81 mounted on the support member 44 which then carried the frame 41 engages and pushes down the extension 78 of the upper contact member 74 to reverse the upper contact member 74 from an open position to a closed position where the upper contact member 74 is in contact with the lower contact member 75 whereby the circuit illustrated in FIG. 14 is closed to supply an electric current through the heating wire 31 and a thermally responsive expansible wire 69 to heat them. Thus the whole apparatus is set in the condition of toasting.

According to the expansion of the wire 69, the lever 64 turns clockwise (FIG. 7), and accordingly the lifting bar 41 is lowered with the latch 61 passing down through the slot 53 so as to be ready for engaging the bracket 52 from its bottom surface. In addition to this, by the lowering of the lifting rod 41, the release lever 84 turns clockwise (FIGS. 7 and 12) by the force of the spring 88 so that the front end 84b of the lever 84 engages and pushes forward the lower end of the push rod 81 against the force of the spring 83 to disengage the push rod from the extension 78 of the upper contact member 74 so that the upper contact member 74 may be reversed from its closed position to the original open position whenever an external force for doing so is applied thereto.

The temperature in the toasting chambers on which the degree of toasting depends is detected by the heat responsive expansible wire 90 as an increase in its length which causes the lever 96 to be turned clockwise (FIG. 9) so that the front end 96b of the lever 96 engages and pushes upward the extension 79 of the lower contact member 75 together with the upper contact member 74 which is contacting the member 75 until the upper contact member is reversed from its closed position to the original open position while leaving the lower contact member 75.

Upon the opening of the circuit, the supply of an electric current to the heating wire 31 and the heat expansible wire 69 is interrupted. The heating of the bread is stopped and the thermally expansive wire 69 is contracted to then turn the lever 64 counterclockwise (FIG. 7). The lifting bar begins to move upward to lift the frame 46 by the latch 61 as shown in FIG. 12. When the free end 46b which is the point of attachment of the spring 49 to the frame 46 reaches a certain moving point, the lifting force F' of the spring 49 mentioned in the above wire reference to FIG. 15 becomes balanced with the total weight of the lever structure 140 including the frames 40 and 41, bread receiving bars 37 and 38, and slices of bread. As soon as this balance point is passed through, the lifting force F' actually actuates the lever structure 140 upward to lift the bread receiving members 37 and 38 to the original non-toasting position as shown in FIG. 13. That is to say, in the toasting position, the lifting force F' is smaller than the total weight of the lever structure 140 supporting the bread receiving bars 37 and 38, and at a certain point of lifting time, the lifting force F' becomes exactly equal to the weight of the lever structure 140, and as it further moves upwards the lifting force F' becomes larger than the total weight of the lever structure 140, thereupon it turns suddenly. In actual working, the contraction of the thermally expansive heating wire is so quick that the time required for the above mentioned reversal is very short, whereby the bread receiving bars can be lifted to the taking-out position immediately after the completion of toasting. By taking out the slice of the bread from the bread receiving bar 38, the bar 38 is turned by the spring 45 to be ready for the next working.

In the embodiment of the invention described in the above, the movement of the spring end holder 46 is automatically carried out in response to the loading of a slice of bread on the bread receiving bar 37 and immediately after the toasting of bread has been completed, respectively. It should, however, be noted that the movement of the spring end holder 46 between the uppermost and lowermost positions may be carried out by manual operation. In any cases, the bread receiving bar can be quickly moved from one position to the other by operating the spring end holder according to the invention. The amount of movement of the spring end holder required for effecting the shifting of the bread receiving bars is very small.

What I claim is:

1. A toaster having a heating unit, at least one bread receiving bar movable between an upper, non-toasting position and a lower, toasting position within a toasting chamber and means for driving said bread receiving bar, said means comprising: a spring end holder movable between a preselected uppermost position and a preselected lowermost position; means for arresting said spring end holder at its uppermost position; a release member for releasing said spring end holder from arrestment at its uppermost position to free it for movement toward its lowermost position; a swing lever structure pivotally carried at its one end, said lever structure supporting at its free end said bread receiving bar; and a tensile spring stretched between said spring end holder and said swing lever structure.

2. A toaster as defined in claim 1, in which the tension of said tensile spring is so preselected that if the spring end holder is at its uppermost position the spring tension is large enough to hold the swing lever structure at its uppermost position while if the spring end holder is at its lowermost position the spring tensile is overcome by the total weight load applied on said swing lever structure when a slice of bread is loaded on said bread receiving bar.

3. A toaster as defined in claim 1, in which said spring end holder comprises another swing lever structure pivotally carried at its one end, said another swing lever having a free end to which one end of said tensile spring is connected.

4. A toaster as defined in claim 3, in which said two swing lever structures are connected at their respective free ends by said tensile spring in a Z-shape.

5. A toaster as defined in claim 1, further including means for actuating said release member in response to the loading of a slice of bread on said bread receiving bar.

6. A toaster as defined in claim 1, further including heat responsive means for detecting completion of the toasting of bread, and means for lifting said spring end holder from its lowermost position to its uppermost position in response to movement of said heat responsive means when the toasting of bread is completed.

7. A toaster as defined in claim 1, further including an electrical switch for controlling said heating unit, said switch being closed by the movement of said swing lever structure when said bread receiving bar reaches its toasting position, heat responsive means for detecting the temperature of the toasting chamber; and means operative by said heat responsive means for opening said switch when the toasting of bread is completed.

References Cited

UNITED STATES PATENTS

| | | | |
|---|---|---|---|
| 2,667,828 | 2/1954 | Koci | 99—329 |
| 2,773,441 | 12/1956 | Ireland | 99—329 |
| 3,129,649 | 4/1964 | Visos | 99—329 XR |
| 3,196,775 | 7/1965 | Altemiller | 99—329 |
| 3,401,625 | 9/1968 | Kimura et al. | 99—329 |
| 3,426,671 | 2/1969 | Sato | 99—329 |

BILLY J. WILHITE, Primary Examiner

U.S. Cl. X.R.

99—393